P. MASSMAN.
ROLLER BEARING.
APPLICATION FILED JUNE 23, 1917.
1,250,607.
Patented Dec. 18, 1917.
3 SHEETS—SHEET 3.
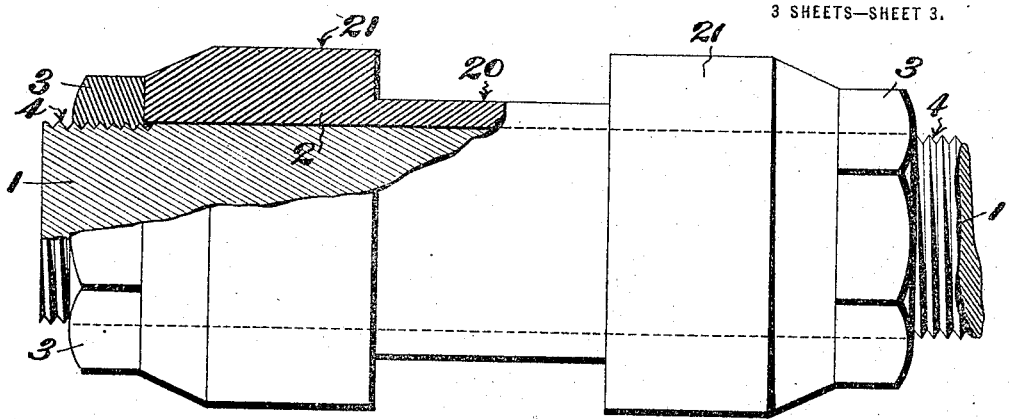
Fig.3.
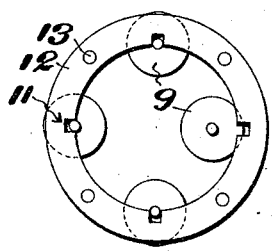
Fig.4.
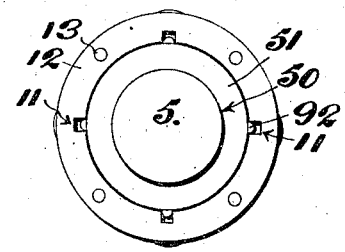
Fig.5.
Fig.7.
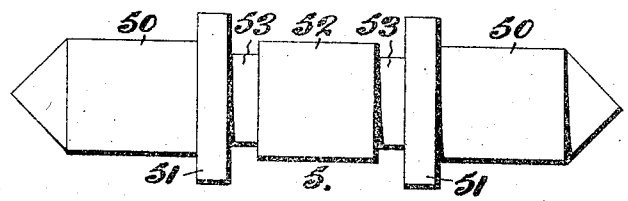
Fig.6.
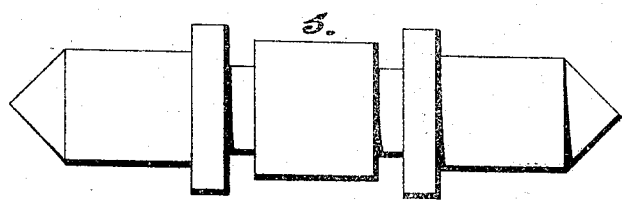
INVENTOR
*Peter Massman.*
BY
*Fred G. Dieterich & Co.*
ATTORNEYS

UNITED STATES PATENT OFFICE.

PETER MASSMAN, OF BUFFALO, NEW YORK, ASSIGNOR OF ONE-HALF TO JOSEPH H. HUBER, OF BUFFALO, NEW YORK.

ROLLER-BEARING.

1,250,607.  Specification of Letters Patent.  Patented Dec. 18, 1917.

Application filed June 23, 1917. Serial No. 176,590.

*To all whom it may concern:*

Be it known that I, PETER MASSMAN, a citizen of the United States, residing at Buffalo, county of Erie, and State of New York, have invented certain new and useful Improvements in Roller-Bearings, of which the following is a specification.

My present invention relates to certain new and useful improvements in roller bearings of the anti-frictionally spaced circular series type, and it primarily has for its object to provide a bearing nearly frictionless as possible, while, at the same time, providing a bearing of the type mentioned of a simple, effective and inexpensive construction and which will readily serve its intended purposes.

My present invention also has for its purpose to provide an improved roller bearing of the general character stated in which the parts are designed for being interchangeable and replaceable when conditions may require it.

My present invention, in its generic nature, embodies an improved arrangement of a bearing sleeve removably mounted on an axle or shaft, a series of main bearing rollers arranged around and having bearing on the opposite ends only on the said sleeves, hub portions for engaging the said opposite ends of the main bearing rollers, a series of intermediate bearing rollers arranged around each alternate ones of the main bearing rollers, a sleeve or casing that takes around the series of intermediate rollers and which has contact with the other alternate ones of the main rollers without the intermediate rollers, and a hub or spokes spreader that takes over all of the roller bearing members and is held out of contact therewith.

My invention also includes those features of construction, combinations and arrangements of parts which will be hereinafter fully explained, specifically pointed out in the appended claims and illustrated in the accompanying drawings, in which:

Fig. 3 is a side elevation, parts being in section, of a portion of an axle and the main sleeve mounted thereon.

Figs. 4 and 5 are end views of the end plates or containers that hold the intermediate rollers in proper position in their coöperative main bearing rollers.

Fig. 6 is a side view of one of the intermediate rollers.

Fig. 7 is a side elevation of one of the main bearing rollers that carry the intermediate rollers.

Fig. 8 is a similar view of one of the main bearing rollers that do not carry intermediate rollers.

Figure 2:
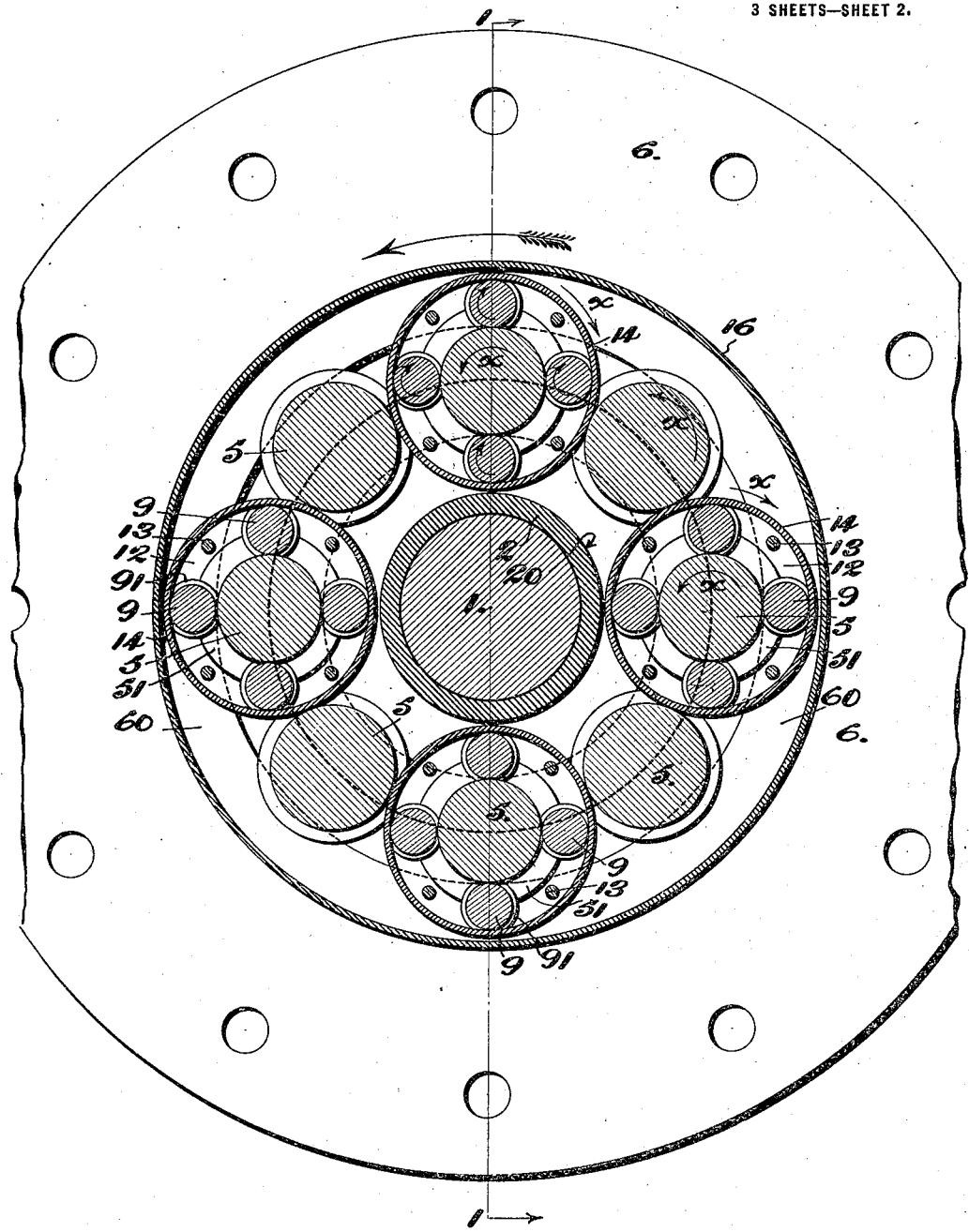
Fig. 2 is a cross section thereof on the line 2—2 of Fig. 1.

In the drawings, in which I have shown my improved roller bearing as applied for use in connection with a wheel hub and axle, 1 designates the axle and 2 a hub bearing in the nature of a sleeve that is removably mounted on the axle, and is held in proper position by end nuts 3—3 that engage threaded portions 4—4 of the axle, as is clearly shown in Fig. 2.

The axle sleeve 2 has a central annular depression or groove 20 and two end bearings 21—21 upon which all of the main roller bearings 5—5 ride, as will presently more fully appear.

Figure 1:
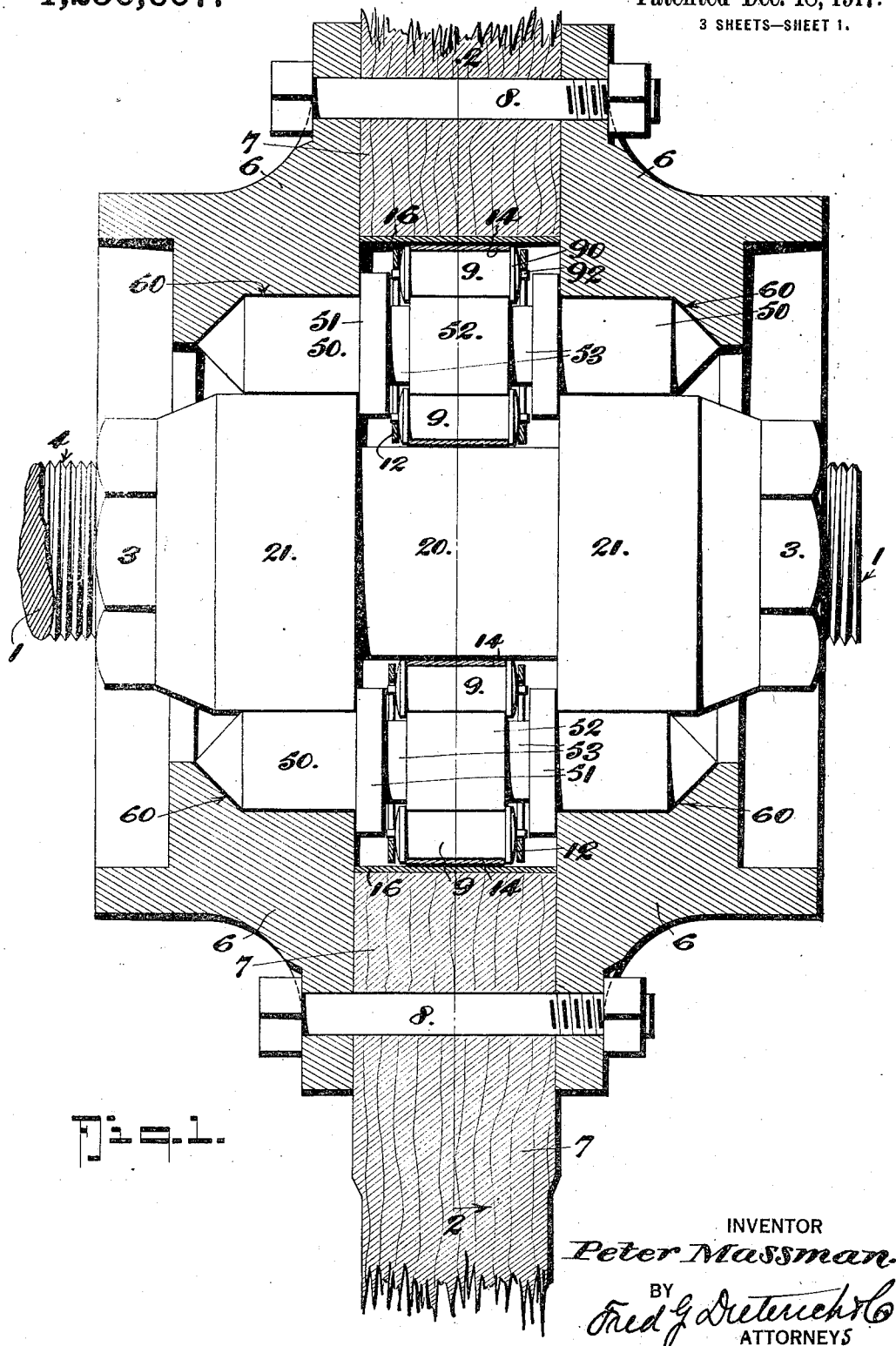
Figure 1 is a longitudinal section of my invention taken substantially on the line 1—1 of Fig. 2.

The hub proper is formed of two like end members 6—6, each of which has an internal annular bearing 50 that engages the opposite ends 50—50 of the main bearing rollers 5 and are held clamped up in proper condition against end collars 51—51 on the main bearing rollers and against the hub ends of the spokes 7—7, by the bolt and clamp devices 8—8, as is best shown in Fig. 1.

By referring more particularly to Fig. 2 of the drawings, it will be noticed that my complete roller bearing includes a series of main rollers 5—5 alternately disposed relatively to the remaining series of main rollers. Each series of rollers includes four rollers, the opposite ends of all of such rollers having bearings on the axle sleeve or hub bearing and the coincident annular bearing 60—60 of the hub members 6—6. Each alternate one of the circular series of main rollers includes a central annular bearing portion 52 and annular end grooves 53—53 located between the collars 51 and the bearing portions 52.

9—9 designate intermediate rollers and of these four are used in connection with each alternate ones of the main rollers 5 and each of the intermediate rollers 9 includes end flanges 90 adapted for riding in the grooves 53 on the respective main rollers on which they are mounted, and a central bearing 91 that rides on the central bearing portions 52 of the said rollers 5, as is fully shown in Fig. 2.

Each intermediate roller 9 also has axial extensions 92—92 at the opposite ends for engaging the radial slots 11 in the end plates 12 that are held up against the ends of the sets of rollers 9 by cross tie rods 13—13, as shown.

By providing for a proper rotation of the several roller bearing members, each set of intermediate rollers 9 is held within a cylindrical sleeve or casing 14 hereinafter termed the roller casing and the said casing is of such diameter and the axial mount of the main roller and the diameters of the intermediate rollers are such that the roller casings 14 engage the alternate ones of the main rollers and the intermediate rollers and are held out of contact with the hub spreader and the main sleeve or hub bearing.

16 designates what I term a hub or spoke spreader which is a cylindrical casing that closes over all the circular series of rollers without engaging any of them and which forms a spreader for holding the inner ends of the spokes in proper condition.

By reason of arranging the several parts in the manner shown and described only the main bearing rollers 5 have direct bearing on the hub bearing and the hub and the bearing of the main rollers is distributed along the various intermediate rollers and the casing 14, it being understood that by referring to Fig. 2 and assuming the wheel to be moving in the direction of the arrow, motion is imparted to the various bearing members and to the shaft or axle in the manner clearly indicated by the arrows x—x on Fig. 2.

From the foregoing description taken in connection with the drawings, the complete arrangement, the manner of its use and the advantages of my present invention will be readily apparent to those skilled in the art to which the present invention relates.

Among other special points of advantage is that the only bearing points are those arranged in circular series and which engage the hub bearing and which are engaged by the wheel hub sections continuously rotative in like directions and the main roller bearings around the hub bearing being positively provided for by the intermediate rollers that engage the main rollers and their respective roller casings which, in turn, engage the alternate ones of the main rollers that do not carry the intermediate rollers.

What I claim is:

1. In a roller bearing, an axle sleeve having spaced end bearing surfaces, a pair of separated like hub sections, one for each end bearing surface of the axle sleeve, each hub section having an internal bearing surface to coöperate with the corresponding end bearing surface of the axle sleeve, main transmission rollers having end bearings that engage the end bearings of the axle sleeve and coöperate with the hub section bearing surfaces, other bearing rollers alternate with the main bearing rollers having end bearing surfaces for engaging the axle sleeve and the hub bearing surfaces and intermediate transmission rollers connecting the main rollers for causing them to rotate in uniform direction.

2. In a roller bearing, an axle sleeve having spaced end bearing surfaces, a pair of like hub sections, one for each bearing surface of the axle sleeve, each hub section having an internal bearing surface to coöperate with the corresponding bearing surface of the axle sleeve, main transmission rollers having end bearings that engage the end bearing surfaces of the axle sleeve and coöperate with the hub section bearing surfaces, other bearing rollers alternate with the main rollers having end bearings for engaging the axle sleeve and the hub section bearing surfaces, and intermediate transmission rollers connecting the main rollers for causing them to rotate in uniform direction, all of the said rollers being arranged in circular series and a continuous spreader casing that takes around all of the circular series of rollers.

3. In a roller bearing, the combination with a spindle, a sleeve fixedly attached to the spindle, said sleeve having a central annular groove and end bearing surfaces, a series of main bearing rollers, each of the said bearing rollers having spindle-like ends for engaging the end bearing surfaces of the sleeves, an annular collar and a central bearing surface, a series of intermediate rollers that ride on the central bearing of each alternate one of the said main rollers, means for retaining the said intermediate rollers in operative position, a casing that incloses the circular series of intermediate rollers and engages the alternate ones of the main rollers, a pair of opposite hub sections each having an internal annular bearing surface for engaging the end pintles of all of the circular series of main rollers, a casing that surrounds all of the sets of rollers in circular series around the axle sleeve, spokes having their hub ends projected between the hub sections and means for holding the hub sections and the coengaging parts in clamped relation.

4. In a roller bearing, the combination with a spindle, an axle bearing sleeve mounted on the spindle, means for holding the said sleeve against endwise movement, said sleeve having a central annular groove and opposite end bearing surfaces, main friction rollers arranged in circular series around the hub bearing sleeve, said rollers each including pintles at the opposite ends that engage the said bearing surfaces of the sleeve, end collars that project into the annular groove of the sleeve, a central bearing surface and end grooves between the central bearing surface and the collars, oppositely disposed hub sections each having an annular internal bearing surface for engaging the pintles of the main rollers, intermediate rollers in circular series mounted on the central bearing on each of the alternate ones of the main rollers, means for holding the said intermediate rollers in operative relation, an annular rim encircling all of the circular series of roller bearings, spokes radiating from the said annular rim, and means for clamping the spokes between the hub sections.

5. In a roller bearing, the combination with a spindle, a pair of end bearing surfaces and an annularly grooved seat between the end bearings on the spindle and a pair of separate opposite hub sections, each having an internal annular bearing surface, the said annular bearing surfaces each being coöperative with an adjacent end bearing surface on the spindle; of a series of main bearing rollers each including spindle-like ends for engaging the end bearings on the spindle and the coöperative annular bearing surfaces on the hub sections, other bearing rollers alternate with the main rollers, transmission rollers that extend within the annular groove on the spindle, said transmission rollers coengaging with the said main rollers for imparting motion to all of the main rollers in uniform direction.

PETER MASSMAN.

Copies of this patent may be obtained for five cents each, by addressing the "Commissioner of Patents, Washington, D. C."